(12) United States Patent
Yoshida (10) Patent No.: US 8,392,979 B2
(45) Date of Patent: Mar. 5, 2013

(54) DOCUMENT PROCESSING AUTOMATED SYSTEM AND IMAGE FORMING APPARATUS

(75) Inventor: Hajime Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 253 days.

(21) Appl. No.: 12/769,220

(22) Filed: Apr. 28, 2010

(65) Prior Publication Data

US 2010/0306840 A1 Dec. 2, 2010

(30) Foreign Application Priority Data

May 29, 2009 (JP) ................................ 2009-130700

(51) Int. Cl.
G06G 7/04 (2006.01)
H04L 29/06 (2006.01)
(52) U.S. Cl. .......................................... 726/9; 713/155
(58) Field of Classification Search .................. 713/155, 713/165, 168, 176, 193; 726/9; 380/278; 709/229
See application file for complete search history.

(56) References Cited

U.S. PATENT DOCUMENTS

| | | | | |
|---|---|---|---|---|
| 7,443,527 B1 * | 10/2008 | Shigeeda | ................... | 358/1.15 |
| 7,730,490 B2 * | 6/2010 | Ito | ................... | 718/106 |
| 8,006,083 B2 * | 8/2011 | Sakakibara | ................... | 713/155 |
| 2006/0136992 A1 | 6/2006 | Shigeeda | | |
| 2007/0206214 A1 | 9/2007 | Kano et al. | | |
| 2008/0002226 A1 * | 1/2008 | Shigeeda | ................... | 358/1.15 |
| 2008/0117452 A1 * | 5/2008 | Murakami | ................... | 358/1.15 |
| 2008/0247004 A1 | 10/2008 | Yeung | | |
| 2009/0025072 A1 * | 1/2009 | Kondo | ................... | 726/7 |
| 2009/0235341 A1 * | 9/2009 | Hashimoto | ................... | 726/5 |
| 2010/0079805 A1 * | 4/2010 | Hashimoto | ................... | 358/1.15 |

FOREIGN PATENT DOCUMENTS

| | | |
|---|---|---|
| CN | 1801710 | 7/2006 |
| CN | 101030237 | 9/2007 |
| JP | 2000-181821 | 6/2000 |
| JP | 2005-333541 | 12/2005 |
| JP | 2006-107477 | 4/2006 |
| JP | 2006-195888 | 7/2006 |
| JP | 2008-259211 | 10/2008 |

* cited by examiner

*Primary Examiner* — Nathan Flynn
*Assistant Examiner* — Abdullah Almamun
(74) *Attorney, Agent, or Firm* — Edwards Wildman Palmer LLP; David G. Conlin; Steven M. Jensen (57) ABSTRACT

It is facilitated to execute a workflow requiring user authentication. When an IC card reading/writing apparatus reads information recorded in an IC card owned by a user, an image forming apparatus transmits user credential information included in the read information to an authentication server. The authentication server performs authentication of the user based on the user credential information transmitted from the image forming apparatus. The image forming apparatus transmits workflow program information included in the information recorded in an authentication token and parameter information for the workflow program to an application server. The application server controls the image forming apparatus based on the workflow program information.

12 Claims, 6 Drawing Sheets

```
CUSTOMIZATION INFORMATION IN IC CARD

# USER CREDENTIAL INFORMATION FOR USING MFP
Credential.UserName = "123456";
Credential.Password = "pa88w0rd";

# WORKFLOW PROGRAM ID FOR AUTOMATIC EXECUTION
AutoRun = "SubmitDailyReport"

# PARAMETERS AT EXECUTING WORKFLOW
SaveToFolder1. Credential. Username = "minosho";
SaveToFolder1. Credential. Password = "pa88wd";
SendEmaiI1 Credential. Username = "minosho";
SendEmaiI1 Credential. Password = "pa88wd";
SendEmaiI1 From = "\"Minosho\"<minosho@sharp.co.jp>"
```

DOCUMENT PROCESSING AUTOMATED SYSTEM AND IMAGE FORMING APPARATUS

CROSS-NOTING PARAGRAPH

This Non-provisional application claims priority under 35 U.S.C. §119(a) on Patent Application No. 2009-130700 filed in JAPAN on May 29, 2009, the entire contents of which are hereby incorporated herein by reference.

FIELD OF THE INVENTION

The present invention relates to a document processing automated system and an image forming apparatus, and more specifically, to a document processing automated system and an image forming apparatus which process documents by workflow processing. The present invention particularly relates to a document processing automated system and an image forming apparatus connected to an office network, shared and used by many people, and further capable of automatically executing custom processing in accordance with application programs created individually.

BACKGROUND OF THE INVENTION

While digital multifunction peripherals having a plurality of functions such as copying, printer and faxing are popularized as image forming apparatuses forming an image on a recording medium, in recent years, digital multifunction peripherals used in offices are connected to a LAN and have a network function equivalent to a network environment of terminal PCs.

Moreover, also in a method for authenticating a user, devices capable of using not only a conventional password input system but also an authentication token such as a non-contact type IC card are put to practical use. In addition, digital multifunction peripherals capable of realizing uniform management of user information by transferring an authentication function to an external server are also popularized.

On the other hand, it is requested for a workflow system that executes each of a plurality of processing in the predetermined order to create an application program including input/output of documents to/from a digital multifunction peripheral. As prior patent documents for realizing this function, for example, "an apparatus for processing input image data in accordance with procedure prescribed in instruction data" (Japanese Laid-Open Patent Publication No. 2005-333541), "a device which appends metadata corresponding to document processing instruction data to document data and commences document processing in accordance with the contents of the metadata" (Japanese Laid-Open Patent Publication No. 2008-259211) and the like are disclosed.

According to Japanese Laid-Open Patent Publication No. 2005-333541, a workflow including input/output work of documents to/from a multifunction peripheral can be executed, however, the operation for execution needs to be performed by a terminal PC of a user.

Moreover, according to Japanese Laid-Open Patent Publication No. 2008-259211, it is possible to cause a server to execute a workflow based on information relating to the workflow which is selected with scanning of an original by a user. However, this method is limited to transmit a scanned image.

In the input/output work of the document to/from the multifunction peripheral, it is necessary to deal with a paper medium for a main body of the multifunction peripheral. Especially, in the scanning operation, processing of the flow stops until the original is set on the multifunction peripheral to execute scanning. Thus, it is natural that the workflow can be selected and executed using an operation panel of the multifunction peripheral.

Here, a user who performs a log-in operation by putting a non-contact type IC card close to the multifunction peripheral does not need to touch the operation panel of the multifunction peripheral because it is different from a log-in operation by inputting a password. With this in mind, it can be said that it remains a point to be improved that the operation of the operation panel of the multifunction peripheral is necessary to select and execute the workflow program. It is preferable that the purpose of the work is completed more quickly by putting the IC card close to the multifunction peripheral for executing a series of operations unique to the card.

Further, it is also considered that a part of the workflow program requires, at the time of execution of the program, user credential information based on a unique management system which is different from a user management system used by an image forming apparatus as processing necessary for sign-on. From a viewpoint of security, it is not appropriate to store credential information in the image forming apparatus and servers, but in this case, there is a merit that the user credential information stored in a secure storage area of the authentication token can be safely given to an arbitrary program by using an authentication token such as an IC card.

SUMMARY OF THE INVENTION

An object of the present invention is to provide a document processing automated system and an image forming apparatus that facilitates the execution of a workflow which requires user authentication by starting an arbitrary program with an arbitrary parameter along with a log-in operation by an authentication token.

Another object of the present invention is to provide a document processing automated system, comprising: an image forming apparatus having an authentication token reading portion for reading information recorded in an authentication token; an authentication server for authenticating a user based on user credential information read by the image forming apparatus; and an application server capable of controlling the image forming apparatus based on workflow program information included in the information read by the image forming apparatus and parameter information for executing the workflow program, wherein when the authentication token reading portion reads the information recorded in the authentication token owned by a user, the image forming apparatus transmits the user credential information included in the read information to the authentication server, the authentication server performs authentication of the user based on the user credential information transmitted from the image forming apparatus, the image forming apparatus transmits the workflow program information included in the information recorded in the authentication token to the application server, and the application server controls the image forming apparatus based on the workflow program information.

Another object of the present invention is to provide the document processing automated system, wherein the image forming apparatus transmits the parameter information for executing the workflow program included in the authentication token to the application server.

Another object of the present invention is to provide the document processing automated system, wherein the information transmitted by the image forming apparatus to the application server includes the user credential information used by the workflow program executed by the application server.

Another object of the present invention is to provide the document processing automated system, wherein the authentication token reading portion has a function of writing information to the authentication token in addition to a function of reading information recorded in the authentication token, and the workflow program executed by the application server reads and writes information of the authentication token through the authentication token reading portion.

Another object of the present invention is to provide the document processing automated system, wherein the authentication token reading portion of the image forming apparatus, when reading workflow program information which is different from each other from a plurality of authentication tokens, transmits the read workflow program to the application server, and the application server controls the image forming apparatus in the order that the authentication token reading portion has read the workflow program information.

Another object of the present invention is to provide the document processing automated system, wherein the authentication token reading portion of the image forming apparatus, when reading the workflow program information and the parameter information from two authentication tokens, respectively, transmits the read workflow program and the parameter information to the application server, and the application server controls the image forming apparatus based on the workflow program information and the parameter information read by the authentication token reading portion.

Another object of the present invention is to provide an image forming apparatus, comprising: an authentication token reading portion for reading information recorded in an authentication token; an authentication portion for authenticating a user based on user credential information read by the authentication token reading portion; and an application execution portion capable of controlling its own function based on workflow program information included in the information read by the authentication token reading portion and parameter information for executing the workflow program, wherein when the authentication token reading portion reads the information recorded in the authentication token owned by a user, the authentication portion performs authentication of the user based on the user credential information included in the read information, and the application execution portion controls a function of the image forming apparatus based on the workflow program information included in the information recorded in the authentication token.

Another object of the present invention is to provide the image forming apparatus, wherein the application execution portion controls functions of the image forming apparatus based on the workflow program information and the parameter information for executing the workflow program included in the authentication token.

Another object of the present invention is to provide the image forming apparatus, wherein the information used for controlling functions of the image forming apparatus by the application execution portion includes user credential information used by the workflow program executed by the application execution portion.

Another object of the present invention is to provide the image forming apparatus, wherein the authentication token reading portion has a function of writing information to the authentication token in addition to a function of reading information recorded in the authentication token, and the workflow program executed by the application execution portion reads and writes information of the authentication token through the authentication token reading portion.

Another object of the present invention is to provide the image forming apparatus, wherein when the authentication token reading portion reads out workflow program information which is different from each other from a plurality of authentication tokens, the application execution portion controls functions of the image forming apparatus in the order that the authentication token reading portion has read the workflow program information.

Another object of the present invention is to provide the image forming apparatus, wherein when the authentication token reading portion reads the workflow program information and the parameter information from two authentication tokens, respectively, the application execution portion controls the image forming apparatus based on the workflow program information and the parameter information read by the authentication token reading portion.

PREFERRED EMBODIMENTS OF THE INVENTION

Figure 1:
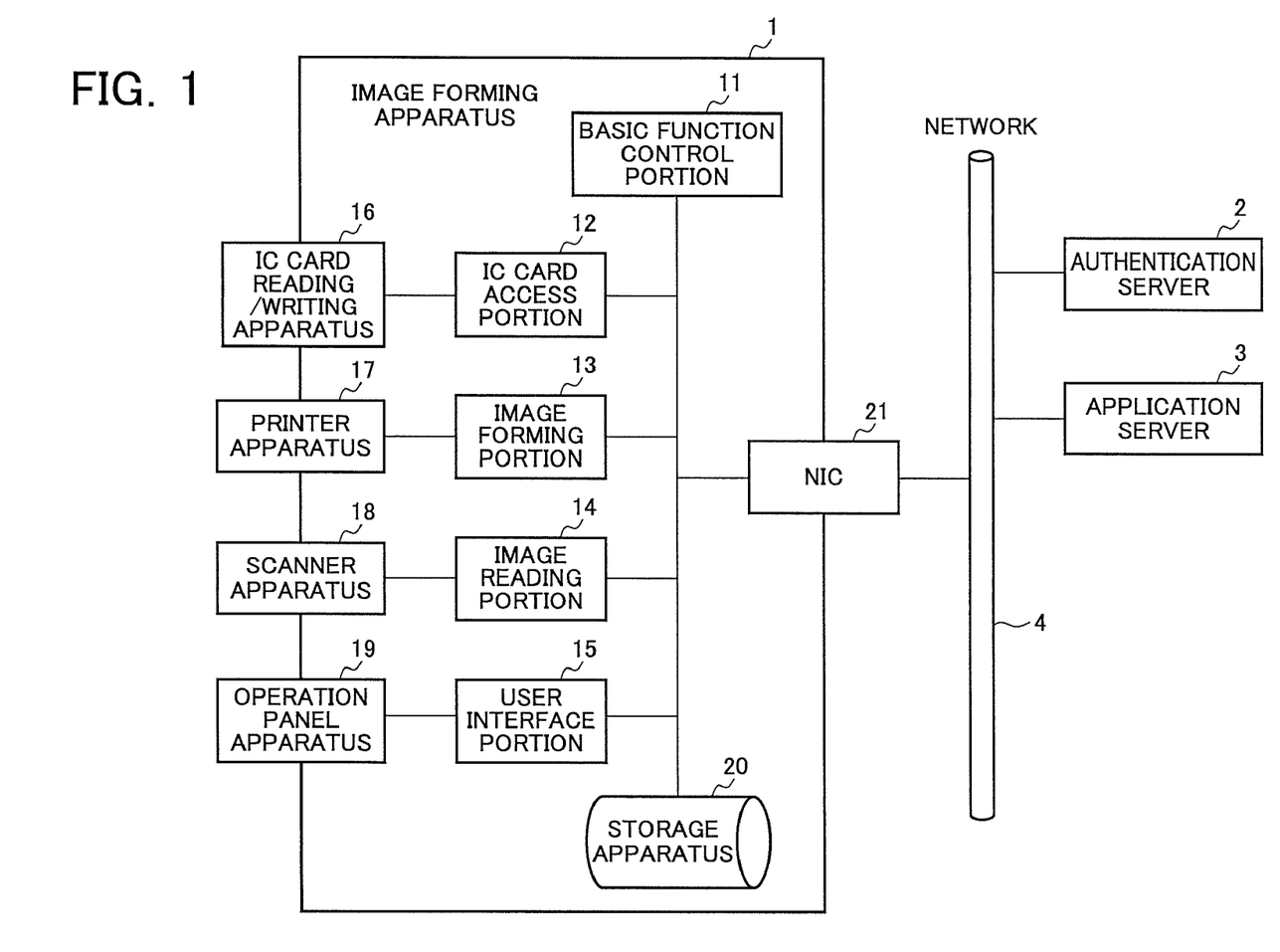
FIG. 1 is a block diagram showing a configuration of a document processing automated system according to an embodiment of the present invention.

FIG. 1 is a block diagram showing a configuration of a document processing automated system according to an embodiment of the present invention. In FIG. 1, the document processing automated system comprises one or more image forming apparatus (digital multifunction peripheral or MFP (Multifunction Peripheral)) 1, one authentication server 2, and one application server 3 which ore connected through a network 4 such as Ethernet (Registered Trademark). Terminal devices such as PCs are connectable to the network 4.

The image forming apparatus 1 comprises a basic function control portion 11, an image forming portion 13, an image reading portion 14, a user interface portion 15, a storage apparatus 20, an operation panel apparatus 19, an NIC (Network Interface Card) 21, a printer apparatus 17, a scanner apparatus 18, an IC card access portion 12, and an IC card reading/writing apparatus 16.

Here, the image forming apparatus 1 in this embodiment will be described as a digital multifunction peripheral provided with a user authentication function using a non-contact type IC card and having a compound function of copying, printing, facsimile, scanner, network communication, etc.

The storage apparatus 20 is a large-capacity nonvolatile storage apparatus such as a hard disc and stores information relating to each of functional portions controlled by the basic function control portion 11 and the progressing state and the result of processing of each of functional portions.

Figure 2:
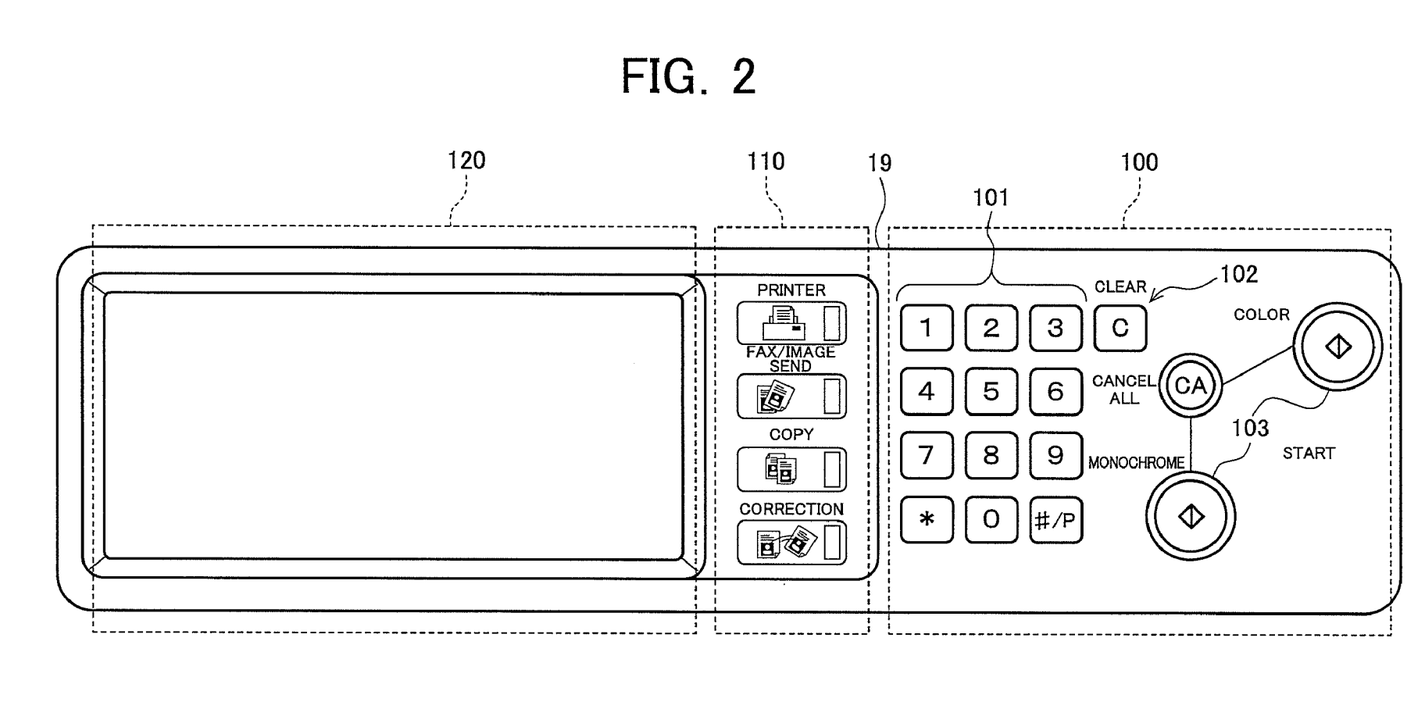
FIG. 2 depicts an external configuration example of an operation panel apparatus provided in an image forming apparatus according to an embodiment of the present invention.

As shown in FIG. 2, the operation panel apparatus 19 is provided with a basic operating portion 100 arranged with ten-key 101, a clear key 102, a start key 103, etc., and a mode selecting portion 110 arranged with buttons for switching function modes (copy function, facsimile/image send function, printer function, etc.,), and a touch panel portion 120 which displays a detailed setting screen, etc., of each function and allows input by a touch operation.

Description will be given referring back to FIG. 1. The basic function control portion 11 is a module which provides standard functions of a conventional digital multifunction peripheral (copying, printing, facsimile send/reception, image send, network service, etc.,) and controls operations of the entire image forming apparatus 1 based on information relating to functions stored in the storage apparatus 20. For example, the basic function control portion 11 monitors input instructions from an input portion of the operation panel apparatus 19, executes any of various modes in response to the input from the NIC 21 appropriately, and controls the scanner apparatus, the printer apparatus, etc.

The user interface portion 15 receives an operation of a user by the input portion or displays input and the result of processing, etc., on a display portion in accordance with an instruction of the basic function control portion 11 by controlling the operation panel apparatus 19 which is connected to it.

The image forming portion 13 applies various kinds of image processing appropriately to image data stored in the storage apparatus 20 and causes the printer apparatus 17 to print on paper by controlling the printer apparatus 17 which is connected to it. The image forming portion 13 also receives image data from an external terminal PC through the NIC 21.

The image reading portion 14 stores the image data indicating an image of an original read by the scanner apparatus 18 in the storage apparatus 20 by controlling the scanner apparatus 18 which is connected to it. Thereafter, in accordance with the processing content instructed by the input portion of the operation panel apparatus 19, the image data stored in the storage apparatus 20 is read out sequentially at an appropriate timing and transferred to the printer apparatus 17. The image reading portion 14 also transmits the image data to the external terminal PC through the NIC 21.

The IC card access portion 12 has a function that detects the proximity of a non-contact type IC card or reads and rewrites information in the IC card by radio by controlling the IC card reading/writing apparatus 16. The representative standard of the non-contact type IC card includes FeliCa (Registered Trademark). Here, while it is configured such that information of an ID card can be read and written by the IC card access portion 12, the IC card is an example of an authentication token of the present invention. Another example of the authentication token includes one provided with a card-sized keypad or a small display portion for displaying a password, etc., or one used by inserting to a USB terminal, etc. That is, the IC card reading/writing apparatus 16 has a function to read information of the authentication token and write information to the authentication token and corresponds to an authentication token reading portion of the present invention.

The authentication server 2 performs identification of a log-in user based on a user table in which users of the image forming apparatus 1 are registered in advance and returns the result of identification to the image forming apparatus 1. The authentication server 2 has a database of user information therein or outside.

The application server 3 receives information for identifying a workflow program installed in the server in advance and executes the program. The program carries out the function of the workflow by controlling the image forming apparatus 1 and communicating with another arbitrary server connected through a network. As a method for the program to control the function of the image forming apparatus 1, Sharp OSA (Registered Trademark) based on a Web service, etc., can be used.

Figure 3:
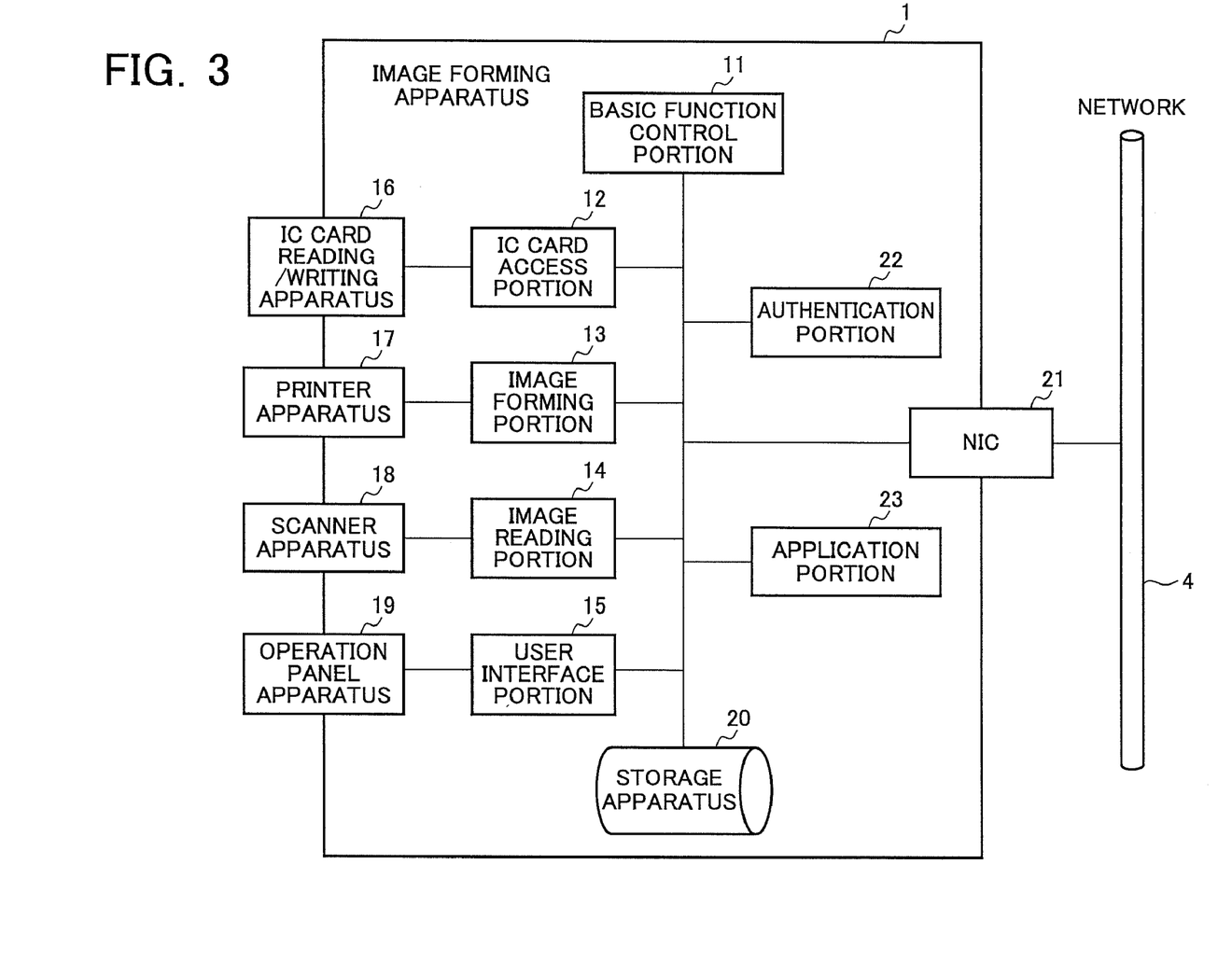
FIG. 3 is a block diagram showing another configuration of the document processing automated system according to an embodiment of the present invention.

FIG. 3 is a block diagram showing another configuration of the document processing automated system according to an embodiment of the present invention. The document processing automated system according to this embodiment is able to realize the function of the document processing automated system of FIG. 1 by the image forming apparatus 1 only by incorporating the functions of the authentication server 2 and the application server 3 of FIG. 1 in the image forming apparatus 1.

The image forming apparatus 1 with the configuration of FIG. 3 is further provided with an authentication portion 22 and an application portion 23 in addition to the configuration of FIG. 1. The authentication portion 22 has the same function as that of the authentication server 2 of FIG. 1 and the application portion 23 has the same function as that of the application server 3 of FIG. 1. Accordingly, the same function as that of the document automated system of FIG. 1 is realized by the image forming apparatus 1 only. Accordingly, the function and operation of individual components are the same as those in the configuration of FIG. 1 so that repeated description for the individual function is omitted.

Moreover, in the case of the configuration of the image forming apparatus 1 of FIG. 3, the IC card reading/writing apparatus 16 corresponds to an authentication token reading portion of the image forming apparatus of the present invention, the authentication portion 22 corresponds to an authentication portion of the present invention, and the application portion 23 corresponds to an application execution portion of the present invention.

Figure 6:
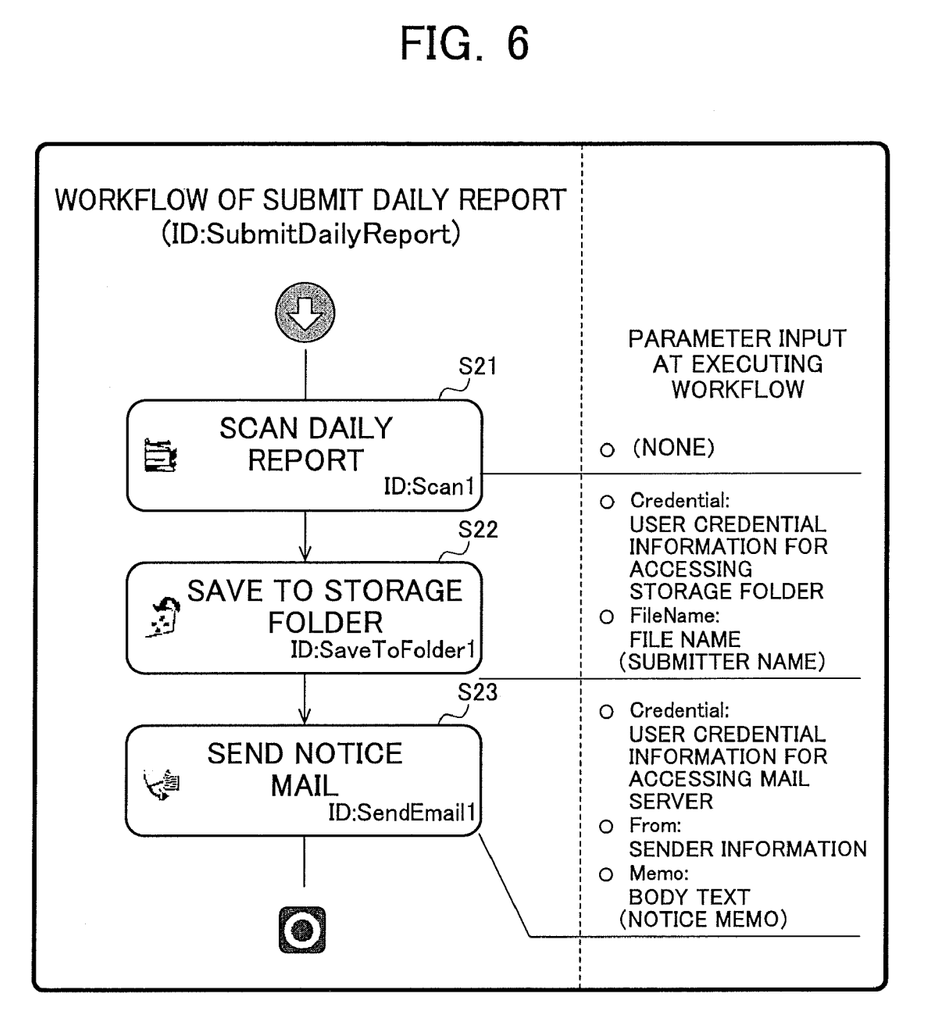
FIG. 6 is an explanatory view of an example of a workflow program executed in an embodiment of the present invention.

Next, description will be given for the processing outline of a workflow processing system of this embodiment. Here, it is assumed that a user creates a workflow program for scan and save as shown in FIG. 6 in a terminal PC in advance with a method based on the document (Japanese Laid-Open Patent Publication No. 2006-107477), such a status is obtained that the workflow program is installed into the application server 3, and the application server 3 is able to receive a Web request and execute the workflow program. Moreover, when the configuration of FIG. 3 is applied, such a status is obtained that the workflow program is installed in the application portion 23 in place of the application server 3.

Figure 5:
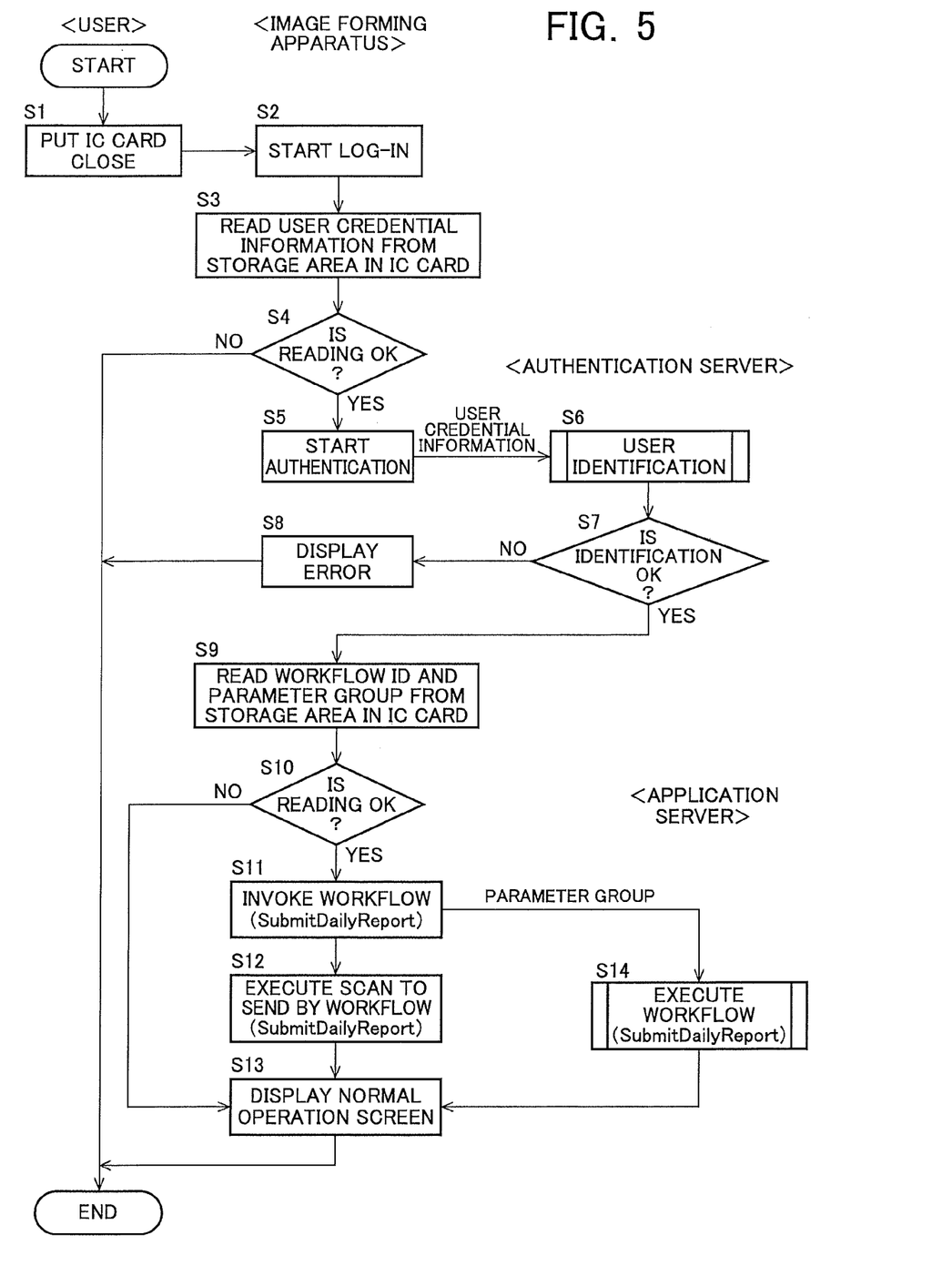
FIG. 5 is a flowchart for illustrating an example of processing in the document processing automated system according to the present invention.

FIG. 5 is a flowchart for illustrating an example of processing in the document processing automated system according to the present invention and shows an example of processing flow when a user of this document processing automated system logs in the system using a non-contact type IC card to execute a workflow program associated with the card with predetermined parameters. Here, although description will be given with reference to the configuration example of FIG. 1, the authentication server 2 and the application server 3 are replaced with the authentication portion 22 and the application portion 23, respectively, when the configuration of FIG. 3 is applied.

Figure 4:
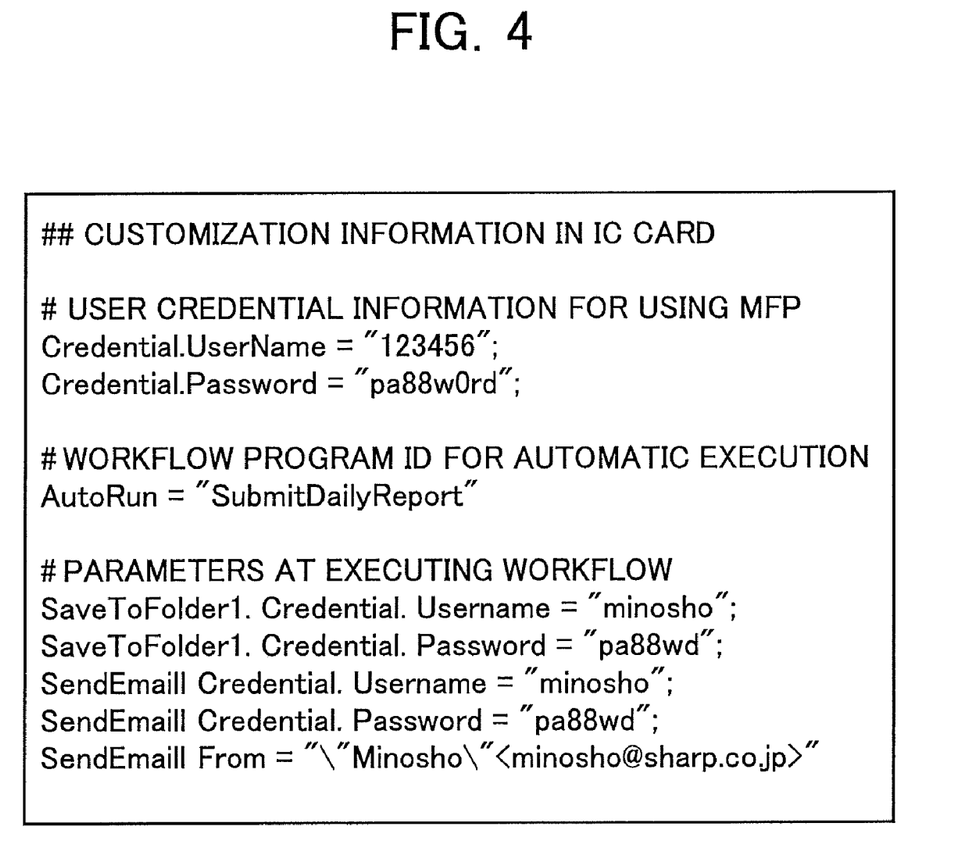
FIG. 4 depicts an example of information stored in an ID card used for an embodiment of the present invention.

As shown in FIG. 4, in the non-contact type IC card, a user name (User Name row) and a password (Password row) are written as credential information of the user, and an ID of the workflow program registered in advance (AutoRun row) and parameters (rows subsequent to Custom Parameters) are recorded. The ID of the workflow program (workflow ID) corresponds to workflow program information of the present invention.

The user of the system tries log-in first by putting the IC card close to the IC card reading/writing apparatus 16 of the image forming apparatus 1 (step S1).

The IC card access portion 12 of the image forming apparatus 1 receives interruption of the proximity of the IC card generated by the IC card reading/writing apparatus 16 and instructs the basic function control portion 11 to start log-in by the IC card (step S2). At the log-in phase, the basic function control portion 11 instructs the IC card access portion 12 to obtain user credential information and reads the user credential information from a storage area in the IC card (step S3). When the user credential information can be read out normally as information, then authentication is started (step S4-Yes). When the user credential information can not be read out normally for such a reason why the standard of the card is different, the processing is terminated without performing log-in processing (step S4-No).

At the authentication phase, the image forming apparatus 1 transmits the user credential information read out from the IC card and additional information arbitrarily input by the user to the authentication server 2 and the authentication server 2 performs identification of the user (step S6). If it can be confirmed that an account of the user is appropriate (step S7-Yes), the basic function control portion 11 of the image forming apparatus 1 subsequently instructs the IC card access portion 12 to obtain a workflow ID and a parameter group, and reads out the workflow ID and the parameter group from the storage area in the IC card (step S9). When the account of the user is inappropriate (step S7-No), an error is displayed on the operation panel apparatus 19 (step S8) and the flow is finished.

In this example, a combination of a user name and a password is used as a typical example of user credential information, but an electronic certificate can be also used as another method. Note that, when others use the IC card illegally, they can easily impersonate the user of the IC card, so that a PIN (Personal identification number) is preferably used in combination at the same time in order to prevent the impersonation. In this case, the image forming apparatus 1 causes the user to input a PIN through the operation panel apparatus 19 and transmits the PIN together with the user credential information in the IC card to the authentication server 2.

When the workflow ID and the parameter group can be read out (step S10-Yes), the image forming apparatus 1 transmits a request for invoking the workflow program having the workflow ID in the way of HTTP (Hyper Text Transfer Protocol) to the application server 3 and requests execution of the program (step S11). In the example of FIG. 4, the workflow program having the ID of "SubmitDailyReport" is invoked. At this time, the request is transmitted including parameters (rows subsequent to Custom Parameters of FIG. 4). When program information is not registered in the IC card or the form is illegal unauthorized (step S10-No), a normal operation screen is displayed (step S13) and the flow is finished.

Note that, in the above example, the workflow program is executed with the workflow ID and the parameter group stored in the IC card, but it is not essential to obtain the parameter group from the IC card, and the workflow program may be executed using a parameter group held in another place. For example, the workflow program may be executed using a parameter set as default to the application server 3 or the workflow program may be executed using a parameter stored as default in the image forming apparatus 1.

The example of the workflow program shown in FIG. 6 is a simple workflow for supporting submission of a daily report. The operation of this program is such a workflow that the MFP is controlled and a daily report is scanned using a scan setting which has been set in advance (S21), a scanned image is saved to a daily report storing folder which has been set in advance (S22), and a notification e-mail that the daily report has been saved is transmitted to a receiver which has been set in advance (S23). Items shown on the right side of FIG. 6 are parameter items which are required to be input at the time of execution of the workflow program.

The application server 3 receives the request to execute the workflow program from the image forming apparatus 1 and executes the installed workflow program of "SubmitDailyReport" (step S14). At this time, the provided parameters are used as the occasion demands.

In the example of FIG. 4, parameters of "SaveToFolder1.Credential.Username" and "SaveToFolder1.Credential.Password" are user credential information which are necessary when the scanned image is saved to a predetermined shared folder in the workflow processing of "SaveToFolder1". Parameters of "SendEmail1.Credential.Username" and "SendEmail1.Credential.Password" are user credential information which are necessary when an e-mail is transmitted in the workflow processing of "SendEmail1". The parameter of "SendEmail1.From" is e-mail sender information transmitted by the workflow processing of "SendEmail1".

In this way, when the parameter is user credential information which is necessary for the operation of the workflow program, log-on processing unique to the application is also executed subsequent to the log-on processing to the MFP, and the convenience is improved.

The parameter of "SendEmail1.Memo" that no value is specified in the IC card among parameters at the time of execution of the workflow of FIG. 6 is an item which is required to be input using the operation panel of the MFP. The workflow program requires input by the user by displaying a dedicated input screen on the operation panel of the MFP.

At the time of execution of the program, the workflow program controls the image forming portion 13 of the image forming apparatus 1 to print a document, controls the image reading portion 14 of the image forming apparatus 1 to scan to send an image, controls the user interface portion 15 of the image forming apparatus 1 to display a unique form for input, or logs into an arbitrary server which is connected through a network, and thereby performs document processing (step S12).

In this example, the workflow program, "SubmitDailyReport", includes an operation of scanning to send an image in order to electronically capture a daily report, writing of a file into a file server, and an operation of transmitting an e-mail using a mail server.

The application server 3, when completing execution of the own workflow program, transmits an end message to the image forming apparatus 1, and the image forming apparatus 1 displays a normal operation screen upon receiving the message (step S13) and waits for the subsequent operation.

The workflow program may also control the IC card access portion 12 of the image forming apparatus 1 to rewrite information in the IC card. The log concerning the workflow can be used as evidence of execution of the workflow by storing it in the IC card which information is not easily tampered.

Note that, in the case where the workflow program is a small-sized script, the program itself may be stored in an area in the IC card. In this case, it is not necessary to install the workflow program in the application server 3 in advance. The read out program can be executed by the image forming apparatus 1 or executed by transmitting to an external server.

Moreover, in the above example, it is configured such that with the workflow program ID (workflow ID) recorded in the IC card, for example, a series of workflow as shown in FIG. 6 is invoked and executed, but it is also possible as another embodiment to configure such that a plurality of IC cards having different workflow ID stored therein are used and these IC cards are continuously read out by the IC card access portion 12 of the image forming apparatus 1, and thereby workflow programs having the workflow IDs recorded in respective the IC cards are invoked and executed one after another.

For example, it is possible that the workflow for submit daily report of the example in FIG. 6 is executed by two IC cards (A, B). In this case, for example, such a workflow ID is prepared that can execute the workflow program which scans a daily report (S21) and saves a scanned image in a daily report storage folder set in advance (S22) and the workflow program which transmits a contact e-mail (S23), separately. Then, the image forming apparatus 1 executes the process from scanning a daily report (S21) until saving a scanned image in a daily report storage folder set in advance (S22) when reading the workflow ID of the card A, and executes a series of process from the above S21 and S22 until transmitting a notice e-mail (S23) when reading the card A and the card B continuously.

Hence, it is possible to assign a workflow ID to a sequence in a specific range of the workflow, and for example, the user is able to add a sequence easily to the program of the workflow using an IC card, and thereby, it is possible to improve the flexibility of the program.

Further, in another embodiment, a plurality of IC cards storing a workflow ID specifying a workflow program stored therein and IC cards storing a parameter group available for executing a plurality of workflow programs stored therein may be used.

For example, IC cards (A, B) are used for specifying a workflow program, a workflow ID of a program executing "Scan to FTP" (scan data and transfer to FTP server) is recorded in the IC card A and a workflow ID of a program executing "Scan to E-mail" (transmit scanned data by e-mail) is recorded in the card B. On the other hand, cards C and D are used for recording parameters used for executing the workflow program, the card C records a parameter, "FTP server name; server X", corresponding to the workflow program, "Scan to FTP", and the card D records a parameter, "destination address: xxx@xyz.co.jp", corresponding to the workflow program, "Scan to E-mail".

Then, the image forming apparatus 1, when reading the workflow ID of the card A and the parameter of the card B, executes "Scan to FTP" based on the parameter of the card C, and when reading the workflow ID of the card B and the parameter of the card D, executes "Scan to E-mail" based on the parameter of the card C.

In this case, when it is desired to transmit data to a different destination using the same workflow program, another IC card may be prepared. For example, when parameters each of which has a different FTP server name are recorded in a plurality of IC cards as parameters of "Scan to FTP", it is possible to specify an FTP server of a destination address of data in accordance with the parameter of the IC card that was used.

Moreover, it is also possible to record parameters such as "scanning resolution of 300 DPI" and "scanning resolution of 600 DPI", in a plurality of cards, C and D, respectively. In this case, information of the resolution is applicable to both "Scan to FTP" of the card A and "Scan to E-mail" of the card B. It becomes possible for the user to combine these cards appropriately and execute the workflow program under the desired condition.

That is, in this example, when the workflow ID and the parameter are read out from two authentication tokens (IC cards), respectively, the function of the image forming apparatus can be controlled based on the workflow ID and the parameter. This makes it possible to easily set parameters that are used for various workflow programs, and improve the operability and the convenience.

According to the present invention, it is possible to provide a document processing automated system and an image forming apparatus that facilitates to execute a workflow which requires user authentication by invoking an arbitrary program with an arbitrary parameter along with a log-in operation by an authentication token.

The invention claimed is:

1. A document processing automated system, comprising:
    an image forming apparatus having an authentication token reading portion for reading information recorded in an authentication token including at least user credential information and workflow program information stored in advance in the authentication token;
    an authentication server for authenticating a user based on the user credential information read by the image forming apparatus; and
    an application server capable of controlling the image forming apparatus based on the workflow program information included in the information read by the image forming apparatus and parameter information for identifying and executing a workflow program installed in the application server, wherein
    when the authentication token reading portion reads the information recorded in the authentication token owned by a user, the image forming apparatus transmits the user credential information included in the read information to the authentication server,
    the authentication server performs authentication of the user based on the user credential information transmitted from the image forming apparatus,
    the image forming apparatus transmits the workflow program information included in the information recorded in the authentication token to the application server, and
    the application server controls the image forming apparatus based on the workflow program information.

2. The document processing automated system as defined in claim 1, wherein
    the image forming apparatus transmits the parameter information for executing the workflow program included in the authentication token to the application server.

3. The document processing automated system as defined in claim 1 or 2, wherein
    the information transmitted by the image forming apparatus to the application server includes the user credential information used by the workflow program executed by the application server.

4. The document processing automated system as defined in claim 1 or 2, wherein
    the authentication token reading portion has a function of writing information to the authentication token in addition to a function of reading information recorded in the authentication token, and
    the workflow program executed by the application server reads and writes information of the authentication token through the authentication token reading portion.

5. The document processing automated system as defined in claim 1 or 2, wherein
the authentication token reading portion of the image forming apparatus, when reading workflow program information which is different from each other from a plurality of authentication tokens, transmits the read workflow program to the application server, and
the application server controls the image forming apparatus in the order that the authentication token reading portion has read the workflow program information.

6. The document processing automated system as defined in claim 1 or 2, wherein
the authentication token reading portion of the image forming apparatus, when reading the workflow program information and the parameter information from two authentication tokens, respectively, transmits the read workflow program and the parameter information to the application server, and
the application server controls the image forming apparatus based on the workflow program information and the parameter information read by the authentication token reading portion.

7. An image forming apparatus, comprising:
an authentication token reading apparatus that reads information recorded in an authentication token including at least user credential information and workflow program information stored in advance in the authentication token;
an authentication device that authenticates a user based on the user credential information read by the authentication token reading apparatus; and
an application execution device that controls its own function based on workflow program information included in the information read by the authentication token reading apparatus and parameter information for identifying and executing a workflow program installed in the application execution device, wherein
when the authentication token reading device reads the information recorded in the authentication token owned by a user, the authentication device performs authentication of the user based on the user credential information included in the read information, and
the application execution device controls a function of the image forming apparatus based on the workflow program information included in the information recorded in the authentication token.

8. The image forming apparatus as defined in claim 7, wherein
the application execution portion controls functions of the image forming apparatus based on the workflow program information and the parameter information for executing the workflow program included in the authentication token.

9. The image forming apparatus as defined in claim 7 or 8, wherein
the information used for controlling functions of the image forming apparatus by the application execution portion includes user credential information used by the workflow program executed by the application execution portion.

10. The image forming apparatus as defined in claim 7 or 8, wherein
the authentication token reading portion has a function of writing information to the authentication token in addition to a function of reading information recorded in the authentication token, and
the workflow program executed by the application execution portion reads and writes information of the authentication token through the authentication token reading portion.

11. The image forming apparatus as defined in claim 7 or 8, wherein
when the authentication token reading portion reads out workflow program information which is different from each other from a plurality of authentication tokens, the application execution portion controls functions of the image forming apparatus in the order that the authentication token reading portion has read the workflow program information.

12. The image forming apparatus as defined in claim 7 or 8, wherein
when the authentication token reading portion reads the workflow program information and the parameter information from two authentication tokens, respectively, the application execution portion controls the image forming apparatus based on the workflow program information and the parameter information read by the authentication token reading portion.

* * * * *